US011138195B2

(12) United States Patent
Young et al.

(10) Patent No.: US 11,138,195 B2
(45) Date of Patent: Oct. 5, 2021

(54) SYSTEMS AND METHODS FOR TRANSLATING N-ARY TREES TO BINARY QUERY TREES FOR QUERY EXECUTION BY A RELATIONAL DATABASE MANAGEMENT SYSTEM

(71) Applicant: salesforce.com, inc., San Francisco, CA (US)

(72) Inventors: John Young, San Francisco, CA (US); Steven Joseph Crouse, Halifax (CA)

(73) Assignee: salesforce.com, inc., San Francisco, CA (US)

(*) Notice: Subject to any disclaimer, the term of this patent is extended or adjusted under 35 U.S.C. 154(b) by 1024 days.

(21) Appl. No.: 15/692,337

(22) Filed: Aug. 31, 2017

(65) Prior Publication Data
US 2019/0065553 A1 Feb. 28, 2019

(51) Int. Cl.
*G06F 16/00* (2019.01)
*G06F 16/2453* (2019.01)
*G06F 16/25* (2019.01)
*G06F 16/33* (2019.01)

(52) U.S. Cl.
CPC ...... *G06F 16/24547* (2019.01); *G06F 16/258* (2019.01); *G06F 16/3332* (2019.01)

(58) Field of Classification Search
USPC ......................................................... 707/765
See application file for complete search history.

(56) References Cited

U.S. PATENT DOCUMENTS

| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 6,092,083 | A | 7/2000 | Brodersen et al. |
| 6,161,149 | A | 12/2000 | Achacoso et al. |
| 6,169,534 | B1 | 1/2001 | Raffel et al. |

(Continued)

*Primary Examiner* — Anhtai V Tran
(74) *Attorney, Agent, or Firm* — LKGlobal | Lorenz & Kopf, LLP

(57) ABSTRACT

A method for obtaining query response data by a relational database management system (RDBMS) is provided. The method receives a user input query, by a processor associated with the RDBMS, wherein the user input query comprises a query request for a set of data; formats the user input query into a second query language suitable for communication between the RDBMS and a query response interface associated with a second data storage external to the RDBMS, by the processor, to generate a reformatted user input query, wherein the RDBMS is configured to perform query operations using an n-ary tree format, and wherein the query response interface is configured to perform query operations using a binary tree format consisting of two child nodes per non-terminal node of a binary tree; and transmits the reformatted user input query to the query response interface, via a communication device communicatively coupled to the processor.

20 Claims, 8 Drawing Sheets

(56) References Cited

U.S. PATENT DOCUMENTS

| | | |
|---|---|---|
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,475 B2 | 8/2010 | Jakobson et al. |
| 8,014,943 B2 | 9/2011 | Jakobsen |
| 8,015,495 B2 | 9/2011 | Achacoso et al. |
| 8,032,297 B2 | 10/2011 | Jakobsen |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2007/0073675 A1* | 3/2007 | Kaar ............... G06F 16/28 |
| 2008/0249972 A1 | 10/2008 | Dillon |
| 2009/0063414 A1 | 3/2009 | White et al. |
| 2009/0100342 A1 | 4/2009 | Jakobson |
| 2009/0132503 A1* | 5/2009 | Sun ............... G06F 16/2452 |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2016/0140228 A1* | 5/2016 | Cohen ............... G06F 16/951 707/708 |

* cited by examiner

SYSTEMS AND METHODS FOR TRANSLATING N-ARY TREES TO BINARY QUERY TREES FOR QUERY EXECUTION BY A RELATIONAL DATABASE MANAGEMENT SYSTEM

TECHNICAL FIELD

Embodiments of the subject matter described herein relate generally to a database computing system obtaining query response data from an external interface. More particularly, embodiments of the subject matter relate to translating queries and query responses such that queries are compatible with a receiving external computer system and such that query responses are compatible with a receiving database computing system.

BACKGROUND

Enterprise software applications used in an organizational environment include a vast array of data. Certain software applications may include one or more multi-tenant databases, a relational database management system, news feeds and social media features, and/or other features for interactions within a group of users and interactions with one or more databases. Such software applications are useful in an organization that includes a large number of users.

When using a relational database management system associated with the enterprise software application, users may search for information regarding topics of interest via a user input query. However, because the enterprise software application may not include an answer to a particular user input query, applicable data may need to be retrieved from an external platform or data storage element. However, external data may not be stored in a form that is compatible with the relational database management system, and the external platform or data storage element may not communicate using protocol compatible with the relational database management system.

Accordingly, it is desirable to ensure compatibility of data transmissions between platforms, such as relational database management systems and external platforms used for data retrieval. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for obtaining query response data by a relational database management system. The method receives a user input query, by a processor associated with the relational database management system, wherein the user input query comprises a query request for a set of data; formats the user input query into a second query language suitable for communication between the relational database management system and a query response interface associated with a second data storage external to the relational database management system, by the processor, to generate a reformatted user input query, wherein the relational database management system is configured to perform query operations using an n-ary tree format, and wherein the query response interface is configured to perform query operations using a binary tree format consisting of two child nodes per non-terminal node of a binary tree; and transmits the reformatted user input query to the query response interface, via a communication device communicatively coupled to the processor.

Some embodiments of the present disclosure provide a system for obtaining query response data by a relational database management system. The system includes: a system memory element; a user interface, configured to receive user input queries, each of the user input queries comprising a query request for data; a communication device, configured to transmit formatted requests from the relational database management system to a query response interface; and at least one processor associated with the relational database management system, the at least one processor communicatively coupled to the system memory element and the user interface, the at least one processor configured to: receive a user input query, via the user interface; format the user input query into a second query language suitable for communication between the relational database management system and a query response interface associated with a second data storage external to the relational database management system, to generate a reformatted user input query, wherein the relational database management system is configured to perform query operations using an n-ary tree format, and wherein the query response interface is configured to perform query operations using a binary tree format consisting of two child nodes per non-terminal node of a binary tree; and transmit the reformatted user input query to the query response interface, via the communication device.

Some embodiments of the present disclosure provide a non-transitory, computer-readable medium containing instructions thereon, which, when executed by a processor, are capable of performing a method for obtaining query response data by a relational database management system. The method receives a user input query, by a processor associated with the relational database management system, wherein the user input query comprises a query request for a set of data; formats the user input query into a second query language suitable for communication between the relational database management system and a query response interface associated with a second data storage external to the relational database management system, by the processor, to generate a reformatted user input query, wherein the relational database management system is configured to perform query operations using an n-ary tree format, and wherein the query response interface is configured to perform query operations using a binary tree format consisting of two child nodes per non-terminal node of a binary tree; transmits the reformatted user input query to the query response interface, via a communication device communicatively coupled to the processor; in response to transmitting the reformatted user input query, receives a query response comprising the binary tree format; translates the query response into the n-ary tree format, to generate a reformatted query response; and presents the reformatted query response, by a display device communicatively coupled to the processor associated with the relational database management system.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
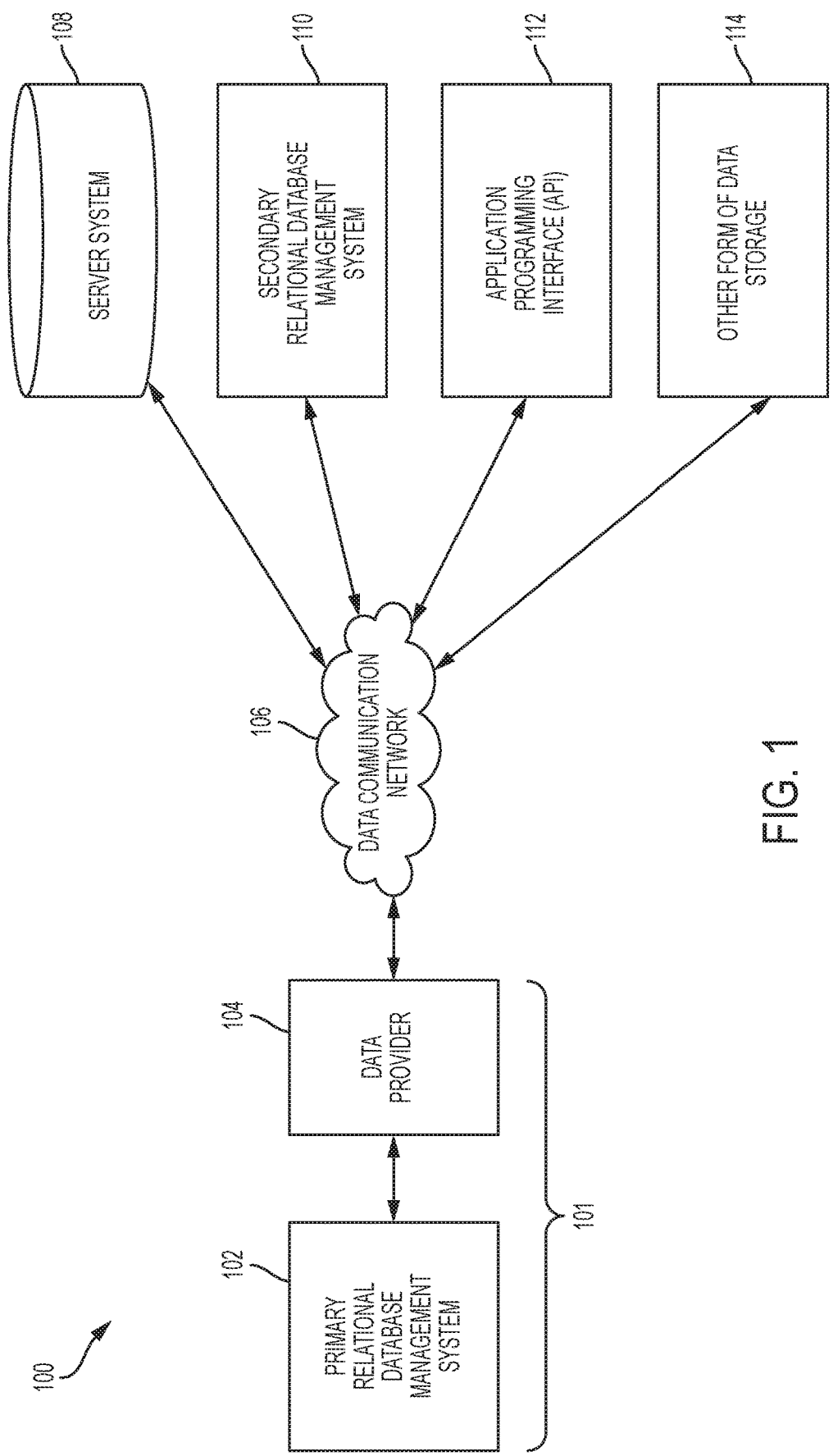
FIG. 1 is a diagram of a system for importing query response data, in accordance with the disclosed embodiments.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to systems and methods for obtaining query response data, by a relational database management system, from an external source (e.g., external computer system, Application Programming Interface (API), or data storage element). More specifically, the subject matter relates to (i) translating user input queries such that each query is compatible with a query response interface communicatively coupled to the relational database management system, and (ii) translating query responses provided by the query response interface such that query responses are compatible with the relational database management system.

Certain terminologies are used with regard to the various embodiments of the present disclosure. A relational database management system includes a collection of data items organized as a set of formally-described tables from which data can be accessed or reassembled in many different ways without having to reorganize the database tables. The relational database management system provides users with a systematic way to create, retrieve, update and manage such data items, and external data retrieved from external data sources. A user input query is an inquiry into the database (e.g., a relational database management system), which is used to extract data from the database in a readable format according to the user request. A query response includes the data extracted from the database and presented to the user. A query response interface operates in conjunction with a data storage element that is external to the relational database management system, such that the query response interface receives translated queries that are compatible with the data storage element and transmits query responses to the relational database management system in a format compatible with the data storage element.

A data provider is a software entity communicatively coupled to a relational database management system for purposes of requesting and importing data from an external data storage. The data provider also translates the user input queries from a format compatible with the primary relational database management system (e.g., an n-ary tree format) to a format compatible with the external data storage element (e.g., a binary tree format), and transmits the reformatted user input query to the data storage element. Further, the data provider performs the reverse translation (e.g., from a binary tree format to an n-ary tree format) when a query response is received from the external data storage.

A binary tree format is a data format including binary trees, wherein each binary tree consists of exactly two child nodes per non-terminal node of the binary tree. However, the n-ary tree format includes n child nodes, where n may be any natural number (i.e., any positive integer). A binary tree is a particular form of an n-ary tree wherein n is equal to two (n=2).

Turning now to the figures, FIG. 1 is a diagram of a system 100 for importing query response data, in accordance with the disclosed embodiments. The system 100 operates to provide query response data to a primary relational database management system 102. The system 100 may include, without limitation, a computer system 101 that communicates with some type of a data storage element, via a data communication network 106, to obtain query response data. In practice, certain embodiments of the system 100 may include additional or alternative elements and components, as desired for the particular application.

The computer system 101 includes a primary relational database management system 102 and a data provider 104. Embodiments of the computer system 101 may be implemented by any computing device that includes at least one processor, some form of memory hardware, a user interface, a display device, and communication hardware. In some embodiments, the primary relational database management system 102 and a data provider 104 are implemented as separate and distinct computing devices that include at least one processor, some form of system memory, and input/output (I/O) hardware and software. In other embodiments, however, the primary relational database management system 102 and a data provider 104 are implemented as one integrated computing device (e.g., computer system 101) which includes hardware and software elements suitable to perform functionality of the primary relational database management system 102 and the data provider 104.

The data storage element is a source of data that is external to the computer system 101, and is configured to store query response data in a format that is distinct from, and incompatible with, the primary relational database management system 102. The data storage element communicates with the computer system 101 via a query response interface (not shown), which may be implemented using an Application Programming Interface (API). The data storage element may include, without limitation, one or more of a server system 108, a secondary relational database management system 110, an Application Programming Interface (API) 112, or some other form of data storage 114. The data storage element stores query response data relevant to the primary relational database management system 102, and which may be requested and imported into the primary relational database management system 102 via the data provider 104.

The computer system 101 communicates with one or more data storage elements using wired and/or wireless communication connections, via the data communication network 106. The data communication network 106 may be any digital or other communications network capable of transmitting messages or data between devices, systems, or components. In certain embodiments, the data communication network 106 includes a packet switched network that facilitates packet-based data communication, addressing, and data routing. The packet switched network could be, for example, a wide area network, the Internet, or the like. In various embodiments, the data communication network 106 includes any number of public or private data connections, links or network connections supporting any number of communications protocols. The data communication network 106 may include the Internet, for example, or any other network based upon TCP/IP or other conventional protocols. In various embodiments, the data communication network 106 could also incorporate a wireless and/or wired telephone network, such as a cellular communications network for communicating with mobile phones, personal digital assistants, and/or the like. The data communication network 106 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

During typical operation, the computer system 101 receives a user input query requiring a query response associated with a data storage element (e.g., server system 108, secondary relational database management system 110, API 112, or some other form of data storage 114) external to the computer system 101. However, the primary relational database management system 102 and the data storage element each store and use query data using different data formats. Generally, the primary relational database management system 102 stores and uses data in an n-ary tree format, and the data storage element stores and uses data in a binary tree format. The binary tree format consists of exactly two child nodes per non-terminal node of a binary tree. However, the n-ary tree format includes n child nodes, where n may be any natural number (i.e., any positive integer). A binary tree is a particular form of an n-ary tree wherein n is equal to two (n=2).

The primary relational database management system 102 requests response data for the received user input query from one or more data storage elements, using the data provider 104. The data provider 104 translates the user input query from a format compatible with the primary relational database management system 102 (e.g., an n-ary tree format) to a format compatible with the applicable data storage element (e.g., a binary tree format), and transmits the reformatted user input query to the data storage element. Additionally, when a query response is received from the data storage element, the data provider 104 performs another translation that is the reverse of the first translation. In other words, the data provider 104 receives the query response from the data storage element in a format compatible with the applicable data storage element (e.g., a binary tree format), and translates the query response to a format compatible with the primary relational database management system 102 (e.g., an n-ary tree format). Thus, the data provider 104 translates the received query response into a usable format such that the primary relational database management system 102 can store and use the received query response.

Figure 2:
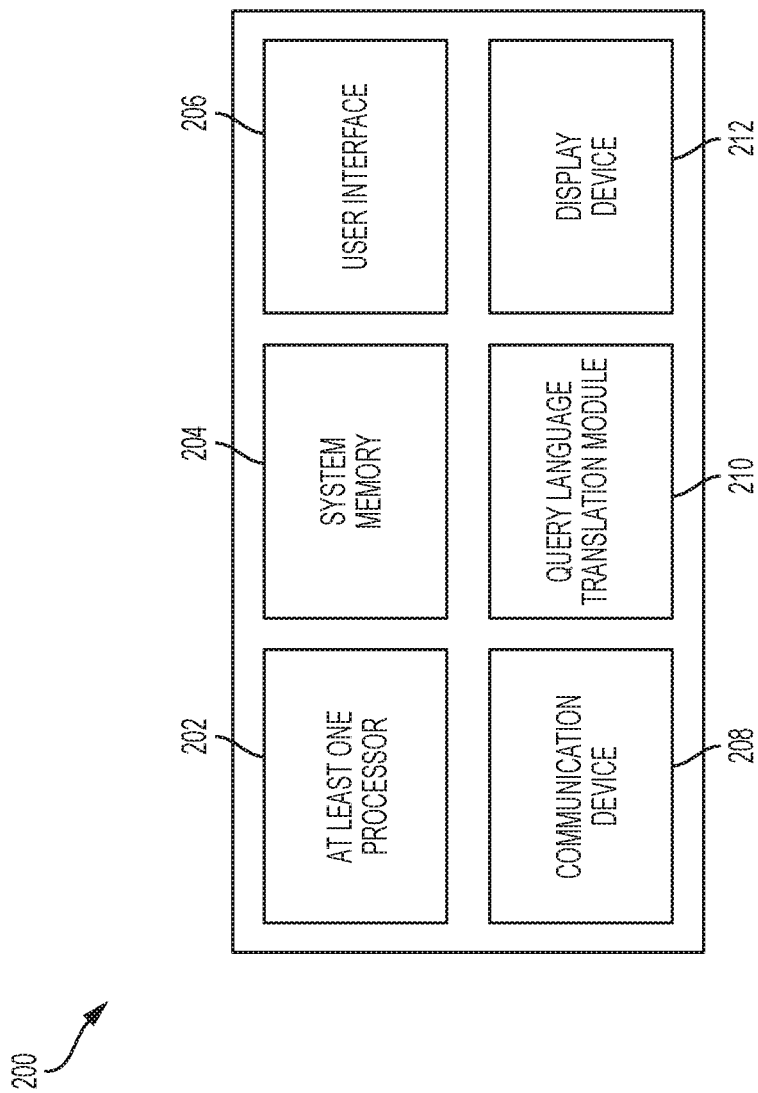
FIG. 2 is a diagram of a computer system, in accordance with the disclosed embodiments.

FIG. 2 is a diagram of a computer system 200, in accordance with the disclosed embodiments. It should be noted that the computer system 200 can be implemented with the computer system 101 depicted in FIG. 1, which performs functionality associated with a relational database management system and a data provider. In this regard, the computer system 200 shows certain elements and components of the computer system 101 in more detail. The computer system 200 generally includes, stores, maintains, operates, and/or executes, without limitation: at least one processor 202; system memory 204 hardware; a user interface 206; a communication device 208; a query language translation module 210; and a display device 212. These elements and features of the computer system 200 may be operatively associated with one another, coupled to one another, or otherwise configured to cooperate with one another as needed to support the desired functionality, as described herein. For ease of illustration and clarity, the various physical, electrical, and logical couplings and interconnections for these elements and features are not depicted in FIG. 2. Moreover, it should be appreciated that embodiments of the computer system 200 will include other elements, modules, and features that cooperate to support the desired functionality. For simplicity, FIG. 2 only depicts certain elements that relate to the techniques described in more detail below.

The at least one processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 202 may be realized as one or more microprocessors, controllers, microcontrollers, or state machines. Moreover, the at least one processor 202 may be implemented as a combination of computing devices, e.g., a combination of digital signal processors and microprocessors, a plurality of microprocessors, one or more microprocessors in conjunction with a digital signal processor core, or any other such configuration.

The at least one processor 202 is communicatively coupled to, and communicates with, the system memory 204. The system memory 204 is configured to store any obtained or generated data associated with translating user input queries and query responses from one data format into a second data format (e.g., a binary tree format to an n-ary tree format). The system memory 204 may be realized using any number of devices, components, or modules, as appropriate to the embodiment. Moreover, the computer system 200 could include system memory 204 integrated therein and/or a system memory 204 operatively coupled thereto, as appropriate to the particular embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the computer system 200. The system memory 204 can be coupled to the at least one processor 202 such that the at least one processor 202 can read information from, and write information to, the system memory 204. In the alternative, the system memory 204 may be integral to the at least one processor 202. As an example, the at least one processor 202 and the system memory 204 may reside in a suitably designed application-specific integrated circuit (ASIC).

The user interface 206 may include or cooperate with various features to allow a user to interact with the computer system 200. Accordingly, the user interface 206 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the computer system 200. For example, the user interface 206 could be manipulated by an operator to enter a user input query for the relational database management system, as described herein.

In certain embodiments, the user interface 206 may include or cooperate with various features to allow a user to interact with the computer system 200 via graphical elements rendered on a display element (e.g., the display device 212). Accordingly, the user interface 206 may initiate the creation, maintenance, and presentation of a graphical user interface (GUI). In certain embodiments, the display device 212 implements touch-sensitive technology for purposes of interacting with the GUI. Thus, a user can manipulate the GUI by moving a cursor symbol rendered on the display device 212, or by physically interacting with the display device 212 itself for recognition and interpretation, via the user interface 206.

The communication device 208 is suitably configured to communicate data between the computer system 200 and one or more data storage elements (e.g., (e.g., server system 108, secondary relational database management system 110, API 112, or some other form of data storage 114 of FIG. 1). The communication device 208 may transmit and receive communications over a wireless local area network (WLAN), the Internet, a satellite uplink/downlink, a cellular network, a broadband network, a wide area network, or the like. As described in more detail below, data received by the communication device 208 may include, without limitation: query response data in a format compatible with the applicable data storage element, or in other words, "pre-translated" data that is not in a format compatible with the relational database management system, and other data compatible with the computer system 200. Data provided by the communication device 208 may include, without limitation, user input query data that has been translated into a format compatible with the applicable data storage element, such that the applicable data storage element can store, interpret, respond, and otherwise use the translated user input query.

The query language translation module 210 is configured to translate a user input query from a format compatible with a relational database management system to a format compatible with an external data storage element, wherein the data storage element stores a query response for the user input query. The query language translation module 210 is also configured to translate a received query response from a format compatible with the external data storage element to a format compatible with the relational database management system. Exemplary embodiments of the query language translation module 210 convert data in an n-ary tree format to binary tree format, and from a binary tree format to an n-ary tree format. In practice, the query language translation module 210 may be implemented with (or cooperate with) the at least one processor 202 to perform at least some of the functions and operations described in more detail herein. In this regard, the query language translation module 210 may be realized as suitably written processing logic, application program code, or the like.

The display device 212 is configured to display various icons, text, and/or graphical elements associated with user input queries, query responses, a relational database management system, or the like. In an exemplary embodiment, the display device 212, the user interface 206, and the at least one processor 202 are communicatively coupled. The at least one processor 202, the user interface 206, and the display device 212 are cooperatively configured to display, render, or otherwise convey one or more graphical representations or images associated with user input queries, query response, an applicable data storage element, and/or a relational database management system on the display device 212, as described in greater detail below. In an exemplary embodiment, the display device 212 is realized as an electronic display configured to graphically display user input query and query response data, as described herein. In some embodiments, the display device 212 is implemented as a display screen of a standalone, personal computing device (e.g., laptop computer, tablet computer). It will be appreciated that although the display device 212 may be implemented using a single display, certain embodiments may use additional displays (i.e., a plurality of displays) to accomplish the functionality of the display device 212 described herein.

Figure 3:
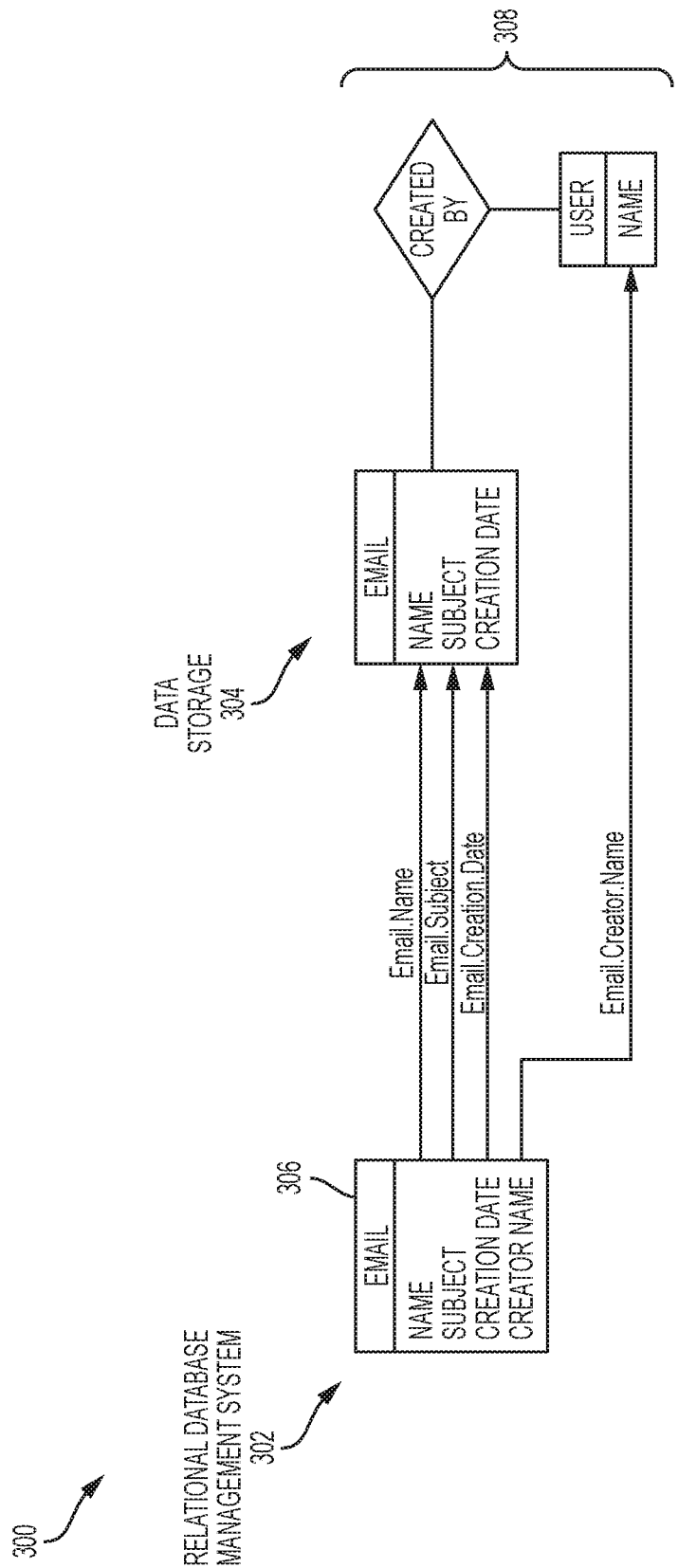
FIG. 3 is a diagram of an exemplary embodiment of field mapping, in accordance with the disclosed embodiments.

FIG. 3 is a diagram 300 of an exemplary embodiment of field mapping, in accordance with the disclosed embodiments. The diagram 300 illustrates aspects of a relational database management system 302 in communication with aspects of an external data storage 304. It should be noted that the relational database management system 302 can be implemented with the primary relational database management system 102 depicted in FIG. 1. Further, it should be noted that the external data storage 304 can be implemented with the one or more of the forms of data storage (e.g., server system 108, secondary relational database management system 110, API 112, other form of data storage 114) depicted in FIG. 1. In this regard, the relational database management system 302 illustrates functionality and data storage structures of the primary relational database management system 102 in more detail, and the external data storage 304 illustrates functionality and data storage structures of the one or more of the forms of data storage (e.g., server system 108, secondary relational database management system 110, API 112, other form of data storage 114) in more detail.

As shown, the relational database management system 302 includes an email object 306, wherein the email object 306 includes data fields such as Name, Subject, Creation Date, and Creator Name. The external data storage 304 includes data fields that correspond to the data fields of the email object 306, but the corresponding data fields are in a data storage structure 308 that is different than the structure of the email object 306.

For data, such as a query, to be transmitted to from the relational database management system 302 to the external data storage 304, the query must be translated or converted into a data format compatible with the external data storage 304. However, prior to translation, each of the data fields of the email object 306 are mapped to corresponding data fields of the external data storage 304. The query is then translated from an n-ary tree format (of the relational database management system 302) to a binary tree format (of the external data storage 304). Prior to "re-shaping" an n-ary tree to a binary tree, or re-shaping a binary tree to an n-ary tree, field mapping is performed in order to create a one-to-one mapping relationship between corresponding data fields of the relational database management system 302 and the external data storage 304. Complexity exists for communications between the relational database management system 302 and the external data storage 304 because there is not an existing one-to-one (1:1) relationship between query fields in the relational database management system 302 and the external data storage 304. Field mapping supports arbitrary query fields, expressions, and sort orders, such that the custom data provider is generally reusable across platform features of the relational database management system 302 which may request data from the external data storage 304.

In some embodiments, a first query language compatible with the relational database management system is a Structured Query Language (SQL) or a Salesforce Object Query Language (SOQL), which uses an n-ary tree format, and a second query language compatible with the data storage system uses a binary tree format. Field mapping is a conversion or translation of a data field compatible with the first query language to a data field compatible with the second query language. In this example, the query response interface may be implemented as an Application Programming Interface (API) for reformatting and transmitting a query from the relational database management system to the data storage location. There is not a one-to-one correlation between data fields of the first query language and data fields of the second query language, and field mapping provides a defined correlation between data fields of the first query language and data fields of the second query language. More specifically, field mapping changes the names of the fields of the n-ary tree, prior to translation into a binary tree. In this particular example, the first query language compatible with, and used for, the relational database management system associates data fields with an object. In contrast, the data storage location associates data fields in a different form, thus requiring data field mapping in order to successfully translate or convert a query from the first query language into the second query language.

Figure 4:
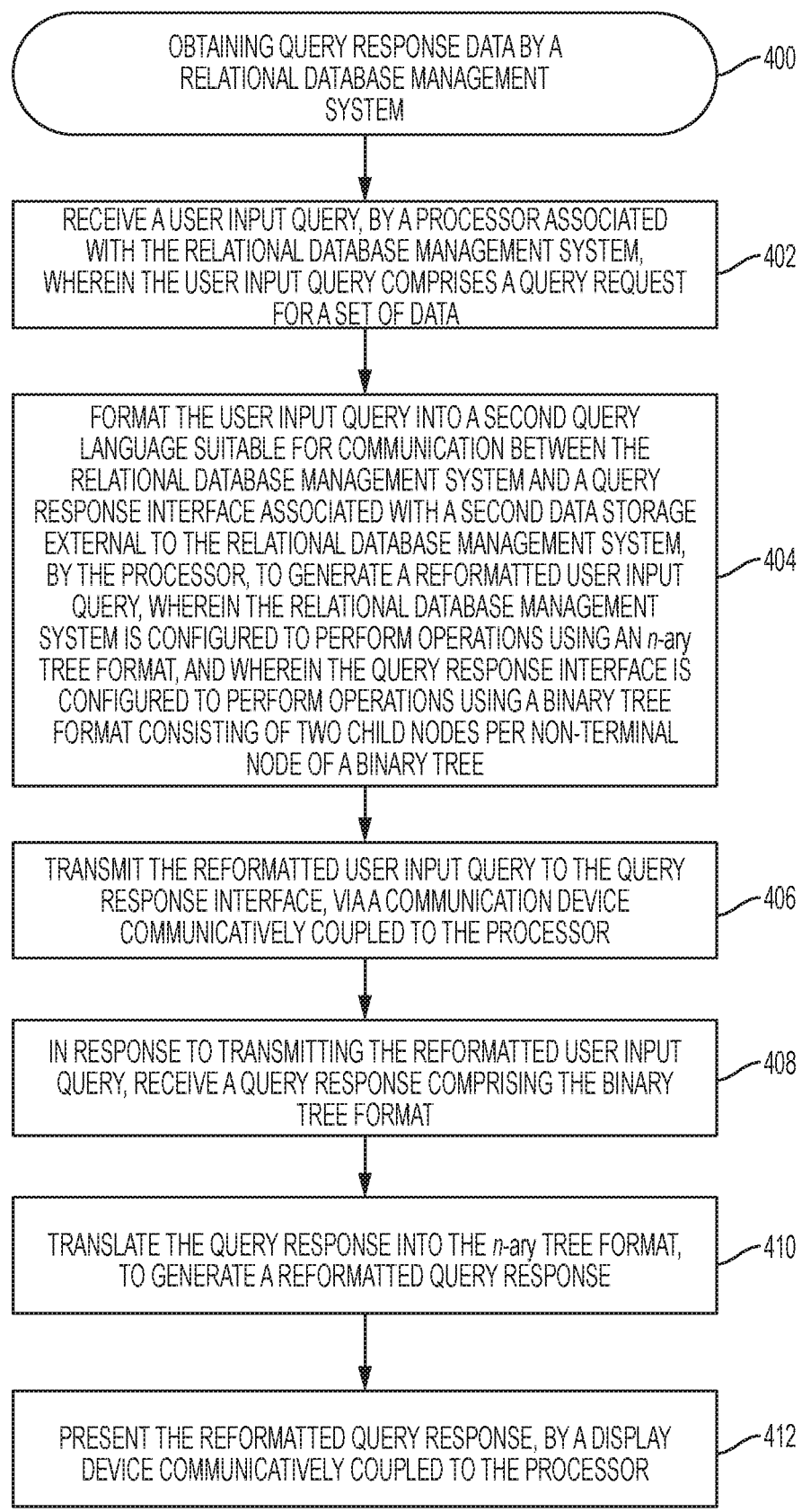
FIG. 4 is a flow chart that illustrates an embodiment of a process for obtaining query response data by a relational database management system, in accordance with the disclosed embodiments.

FIG. 4 is a flow chart that illustrates an embodiment of a process 400 for obtaining query response data by a relational database management system, in accordance with the disclosed embodiments. The process 400 first receives a user input query, by a processor associated with the relational database management system, wherein the user input query comprises a query request for a set of data (step 402). One suitable methodology for receiving a user input query is described below with reference to FIG. 5.

The user input query may be any user request for a particular set of data, received by a relational database management system, during a user interaction with the relational database management system. The requested set of data is generally stored and maintained by a data storage entity that is separate and distinct from the relational database management system, and the data storage entity is external to the relational database management system. Here, the user enters the query via a user interface of the relational database management system, and the user may or may not be aware of the storage location of the requested data set. To provide the requested data to the user via the relational database management system, the process 400 must first request and import the requested data. In the embodiment of the process 400 described herein, requesting and importing a user-requested set of data requires translation or format conversion of the data set such that the data set is compatible with the relational database management system.

The process 400 then formats the user input query into a second query language suitable for communication between the relational database management system and a query response interface associated with a second data storage external to the relational database management system, by the processor, to generated a reformatted user input query (step 404). One suitable methodology for formatting the user input query into a second query language is described below with reference to FIG. 6.

The relational database management system is configured to perform operations using an n-ary tree format, and the query response interface is configured to perform operations using a binary tree format consisting of two child nodes per non-terminal node of a binary tree. Thus, the relational database management system and the query response interface perform operations using data that is formatted differently, and requesting (i.e., querying) and importing such data into a separate and distinct entity (e.g., the relational database management system, the query response interface, the external data storage) requires reformatting to facilitate communication and compatibility of data. Here, formatting the user input query into the query language further comprises translating the n-ary tree format of the user input query into the binary tree format, to create a resultant binary tree query, wherein the reformatted user input query comprises the resultant binary tree query; and transmitting the reformatted user input query further comprises passing the resultant binary tree query to the query response interface via a data provider (described previously with regard to FIG. 1).

The process 400 transmits the reformatted user input query to the query response interface, via a communication device communicatively coupled to the processor (step 406). The reformatted user input query may be transmitted via a hardwired and/or wireless communication connection. In response to transmitting the reformatted user input query, the process 400 receives a query response comprising the binary tree format (step 408). Here, the query response interface retrieves the requested set of data from the second data storage that is external to the relational database management system, and the process 400 receives the requested set of data from the query response interface. In the second data storage location, the requested set of data is in a format that is compatible with the second data storage location (e.g., the binary tree format). Thus, the process 400 receives the requested set of data in the binary tree format.

The process 400 then translates the query response into the n-ary tree format, to generate a reformatted query response (step 410). In the exemplary embodiment of the process 400 described herein, the relational database management system is configured to perform operations using the n-ary tree format. However, the query response (i.e., the requested set of data) has been imported and received by the process 400 in an object tree format. In exemplary embodiments, the response is an object tree or a list. Here, the process 400 converts the format of the query response into a format compatible with the relational database management system, such that the relational database management system is capable of storing and using the query response.

Additionally, the process 400 presents the reformatted query response, by a display device communicatively coupled to the processor (step 412). The user has requested the query response, via the relational database management system, and the query response has been converted into a format compatible with the relational database management system (e.g., the binary tree format). Here, the process 400 presents the requested set of data such that the requested set of data may be viewed by the user.

In certain embodiments, the relational database management system includes an object-based database. In class-based, object-oriented programming, an object is a particular instance of a class where the object can be a combination of variables, functions, and data structures. A class is an extensible program-code-template for creating objects, providing initial values for state (member variables) and implementations of behavior (member functions or methods). When an object is created by a constructor of the class, the resulting object is called an instance of the class, and the member variables specific to the object are called instance variables, to contrast with the class variables shared across the class. In this embodiment, after receiving and reformatting the query response, the process 400 may create one or more standard objects suitable for interpretation and use by the relational database management system, based on the reformatted query response in the object tree format, and incorporate the one or more standard objects into the relational database management system.

Figure 5:
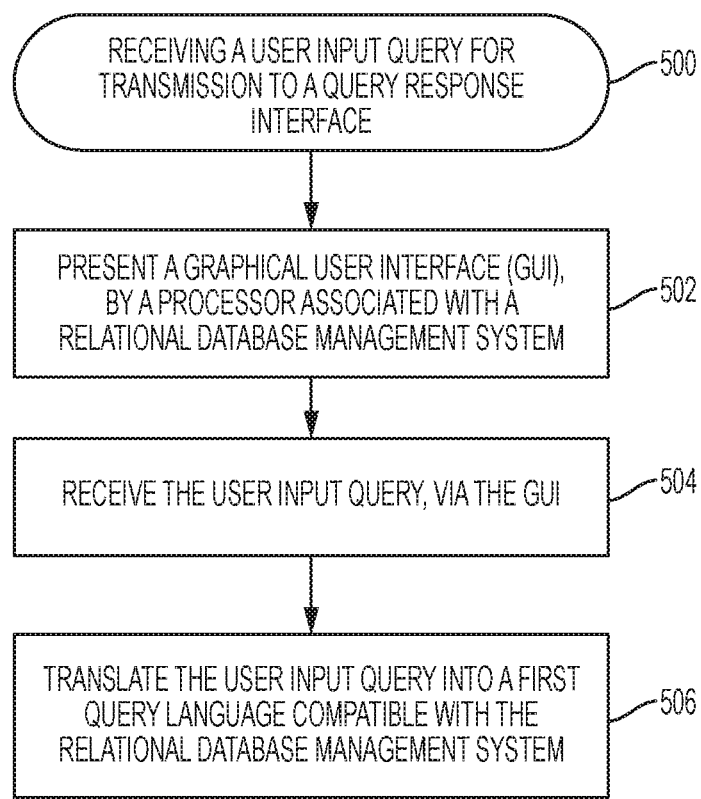
FIG. 5 is a flow chart that illustrates an embodiment of a process for receiving a user input query for transmission to a query response interface, in accordance with the disclosed embodiments.

FIG. 5 is a flow chart that illustrates an embodiment of a process 500 for receiving a user input query for transmission to a query response interface, in accordance with the disclosed embodiments. It should be appreciated that the process 500 described in FIG. 5 represents one embodiment of step 402 described above in the discussion of FIG. 4, including additional detail.

First, the process 500 presents a graphical user interface (GUI), by a processor associated with a relational database management system (step 502), and the process 500 receives the user input query, via the GUI (step 504). The exemplary embodiment of the process 500 described herein is a method for receiving a user input query, by a relational database management system, wherein the user input query is a request for information stored and maintained by a data storage location external to the relational database management system. Here, the GUI is presented by the relational database management system, and thus the user input query is received directly by the relational database management system.

The process 500 then translates the user input query into a first query language compatible with the relational database management system (step 506). The user input query is a data entry provided by the user to the GUI. The user input query has been received, via the GUI, in a format that may include graphical elements and/or text. Here, the process 500 converts the received graphical elements and/or text into a query language that may include, without limitation, Structured Query Language (SQL), Salesforce Object Query Language (SOQL), or the like. Once translated into the first query language, the relational database management system is capable of interpreting and using the user input query.

Figure 6:
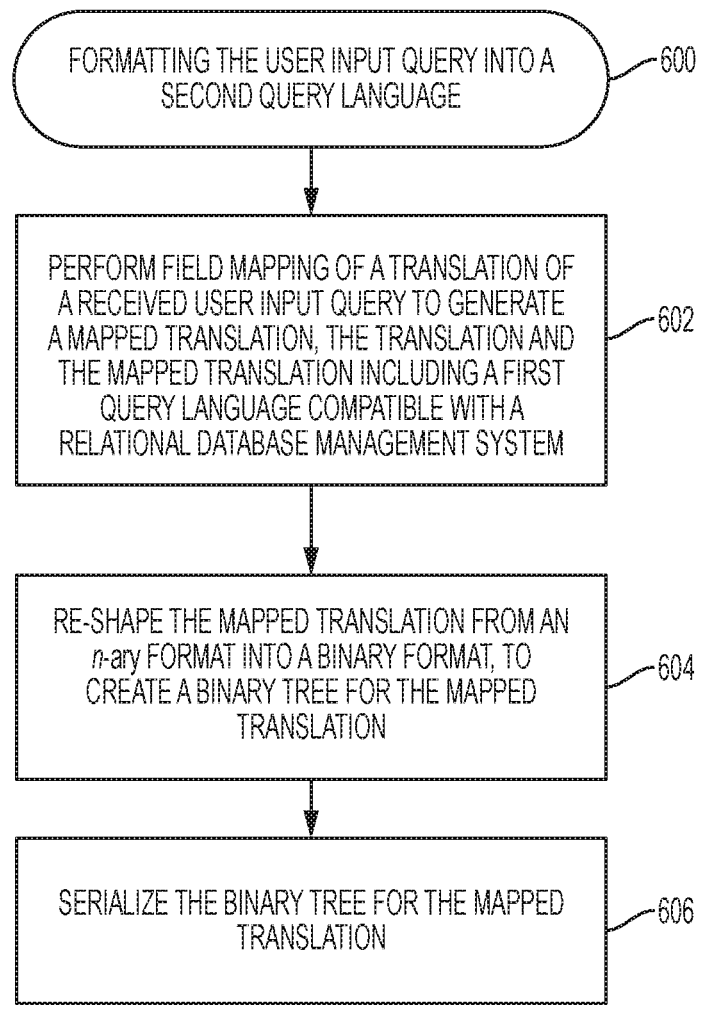
FIG. 6 is a flow chart that illustrates an embodiment of a process for formatting the user input query, in accordance with the disclosed embodiments.

FIG. 6 is a flow chart that illustrates an embodiment of a process 600 for formatting the user input query, in accordance with the disclosed embodiments. It should be appreciated that the process 600 described in FIG. 6 represents one embodiment of step 404 described above in the discussion of FIG. 4, including additional detail. First, the process 600 performs field mapping of a translation of a received user input query to generate a mapped translation (step 602). The translation and the mapped translation include a first query language compatible with a relational database management system. However, the data storage location that stores and maintains the requested data (i.e., the query response) uses a second query language compatible with the data storage location.

In some embodiments, the first query language compatible with the relational database management system is a Structured Query Language (SQL) or a Salesforce Object Query Language (SOQL), which uses an n-ary tree format, while the second query language compatible with the data storage system uses a binary tree format. Field mapping is a conversion or translation of a data field compatible with the first query language to a data field compatible with the second query language. Field mapping is described previously with regard to FIG. 3. In this example, the query response interface may be implemented as an Application Programming Interface (API) for reformatting and transmitting a query from the relational database management system to the data storage location. There is not a one-to-one correlation between data fields of the first query language and data fields of the second query language, and field mapping provides a defined correlation between data fields of the first query language and data fields of the second query language. More specifically, field mapping changes the names of the fields of the n-ary tree, prior to translation into a binary tree. In this particular example, the first query language compatible with, and used for, the relational database management system associates data fields with an object. In contrast, the data storage location associates data fields in a different form, thus requiring data field mapping in order to successfully translate or convert a query from the first query language into the second query language.

The process 600 then re-shapes the mapped translation from an n-ary format into a binary format, to create a binary tree for the mapped translation (step 604). One suitable methodology for re-shaping the mapped translation from an n-ary format into a binary format is described below with reference to FIG. 7. The query produced and transmitted by the relational database management system is in an n-ary tree format, and the query response interface requires data to be received in a binary tree format. Conversion of the n-ary tree format into the binary tree format is performed by the process 600 using conventional methods and techniques that are well-known in the art.

The process 600 also serializes the binary tree for the mapped translation (step 606). Here, the process 600 serializes the binary tree to transform the binary tree into a textual representation of the actual query for transmission to the query response interface. In some embodiments, the process 600 uses JavaScript Object Notation (JSON) to serialize the binary tree. In other embodiments, the process 600 uses Extensible Markup Language (XML) to serialize the binary tree. In summary, the process 600 coverts the input expression tree into a form suitable to the query response interface (e.g., an API external to the relational database management system), maps input data fields to corresponding data fields associated with the query response interface and the data storage location, and serializes the query request for transmission to the query response interface.

Figure 7:
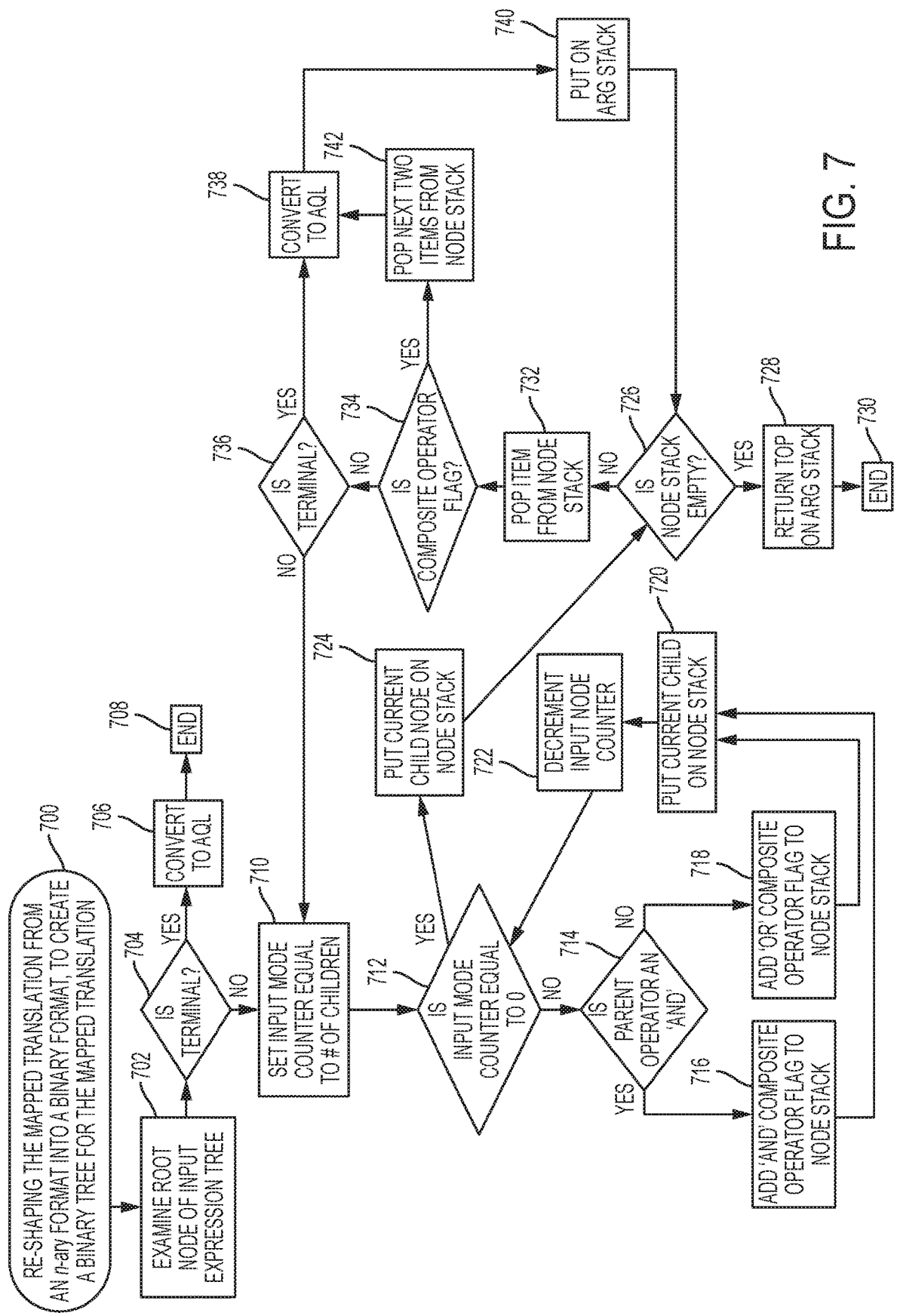
FIG. 7 is a flow chart that illustrates an embodiment of a process for re-shaping a mapped translation from an n-ary format into a binary format, to create a binary tree for the mapped translation, in accordance with the disclosed embodiments.

FIG. 7 is a flow chart that illustrates an embodiment of a process 700 for re-shaping a mapped translation from an n-ary format into a binary format, to create a binary tree for the mapped translation, in accordance with the disclosed embodiments. It should be appreciated that the process 700 described in FIG. 7 represents one embodiment of step 604 described above in the discussion of FIG. 6, including additional detail.

First, the process 700 examines the root node of the input expression tree (step 702), and determines whether the root node of the input expression tree is a terminal node (704), wherein a terminal node is a node of a tree data structure that has no child nodes. When the root node is a terminal node (the "Yes" branch of 704), then the process 700 converts the input expression tree to a query language (step 706), and then the process 700 ends (step 708). In certain embodiments, process 700 implements the query language using ArangoDB Query Language (AQL). In other embodiments, process 700 implements the query language using Structured Query Language (SQL). When the root node is not a terminal node (the "No" branch of 704), then the process 700 sets the input node counter equal to the number of child nodes of the root node of the input expression tree (step 710).

The process 700 then determines whether the input node counter is equal to zero (712). When the input node counter is not equal to zero (the "No" branch of 712), the process 700 determines whether the parent operator is an 'AND' operator (714). When the parent operator is an 'AND' operator (the "Yes" branch of 714), the process 700 adds an 'AND' composite operator flag to the node stack (step 716), puts the current child on the node stack (step 720), decrements the input node counter (step 722), and returns to decision 712 to determine whether the input node counter is equal to zero (712). When the parent operator is not an 'AND' operator (the "No" branch of 714), the process 700 adds an 'OR' composite operator flag to the node stack (step 718), puts the current child on the node stack (step 720), decrements the input node counter (step 722), and returns to decision 712 to determine whether the input node counter is equal to zero (712).

However, when the input node counter is equal to zero (the "Yes" branch of 712), the process 700 puts the current child node on the node stack (step 724), and determines whether the node stack is empty (726). When the node stack is empty (the "Yes" branch of 726), the process 700 returns the top on the argument stack (step 728), and the process 700 ends (step 730). When the node stack is not empty (the "No" branch of 726), the process 700 pops an item from the node stack (step 732) and determines whether the item is associated with a composite operator flag (734).

When the item popped from the node stack is associated with a composite operator flag (the "Yes" branch of 734), the process 700 pops the next two items from the node stack (step 742), converts to a query language (step 738), puts the converted item on the argument stack (step 740), and returns to decision 726 to determine whether the node stack is empty (726).

When the item popped from the node stack is not associated with a composite operator flag (the "No" branch of 734), the process 700 determines whether the node is a terminal node (736). When the node is a terminal node (the "Yes" branch of 736), the process 700 converts to a query language (step 738), puts the converted item on the argument stack (step 740), and returns to decision 726 to determine whether the node stack is empty (726). When the node is not a terminal node (the "No" branch of 736), the process 700 returns to step 710 to set the input node counter equal to the number of child nodes of the input expression tree (step 710).

The various tasks performed in connection with processes 400-700 may be performed by software, hardware, firmware, or any combination thereof. For illustrative purposes, the preceding descriptions of processes 400-700 may refer to elements mentioned herein, in connection with FIGS. 1-3 and 8. In practice, portions of processes 400-700 may be performed by different elements of the described system. It should be appreciated that processes 400-700 may include any number of additional or alternative tasks, the tasks shown in FIGS. 4-7 need not be performed in the illustrated order, and processes 400-700 may be incorporated into a more comprehensive procedure or process having additional functionality not described in detail herein. Moreover, one or more of the tasks shown in FIGS. 4-7 could be omitted from embodiments of the processes 400-700 as long as the intended overall functionality remains intact.

Figure 8:
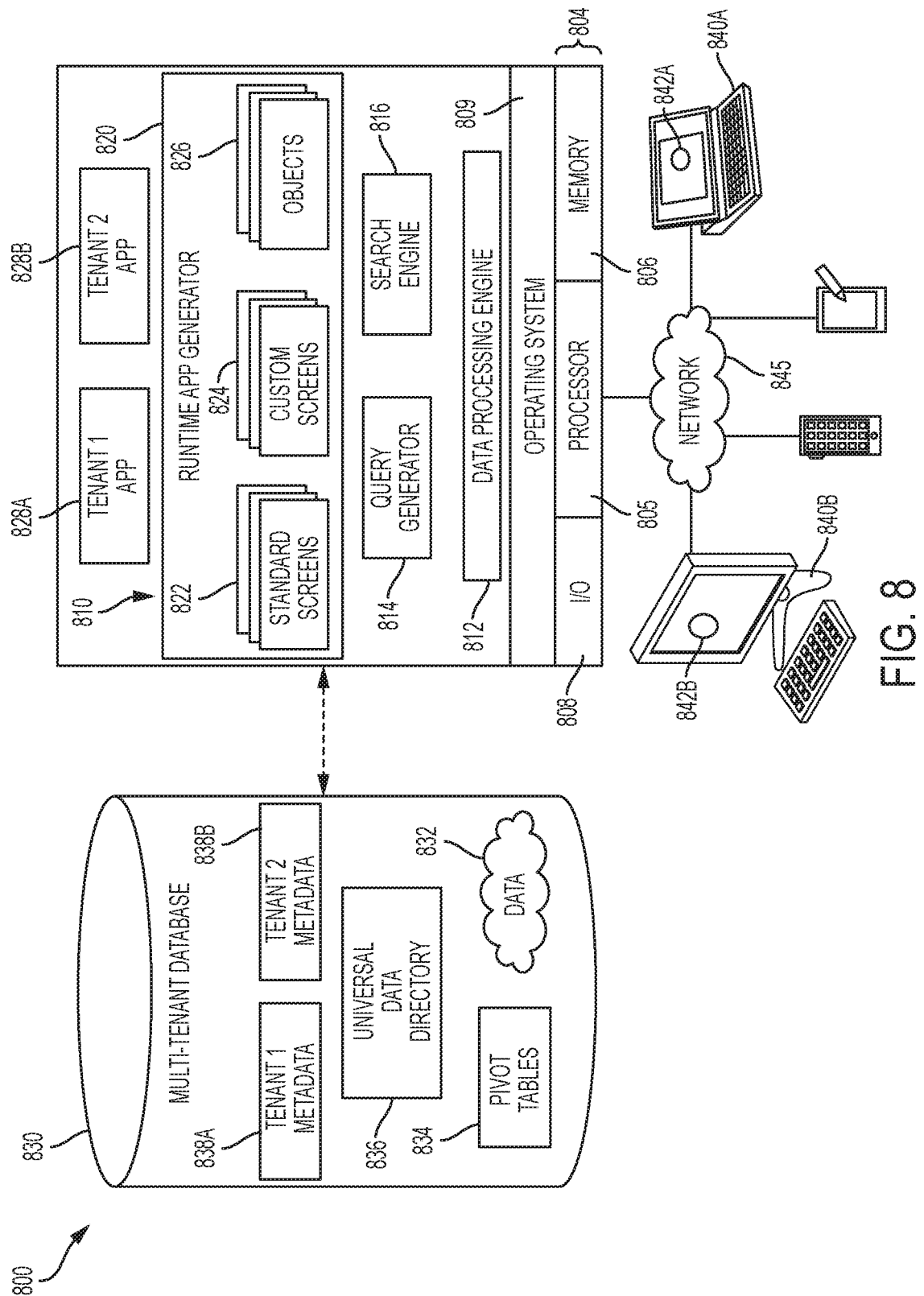
FIG. 8 is a conceptual block diagram of a multi-tenant system in accordance with the disclosed embodiments.

FIG. 8 is a conceptual block diagram of a multi-tenant system 800 in accordance with the disclosed embodiments. The multi-tenant system 800 may be used to in conjunction with the relational database management system and/or enterprise software applications described previously. Platform as a Service (PaaS) is the foundation of the multi-tenant architecture. At the heart, this PaaS is a relational database management system. All of the core mechanisms in a relational database management system (RDBMS) (e.g., a system catalog, caching mechanisms, query optimizer, and application development features) are built to support multi-tenant applications and to be run directly on top of a specifically tuned host operating system and raw hardware. The runtime engine has the intelligence to access the metadata and transactional data and perform the application functionality that can scale.

The multi-tenant system 800 of FIG. 8 includes a server 802 that dynamically creates and supports virtual applications 828 based upon data 832 from a common database 830 that is shared between multiple tenants, alternatively referred to herein as a multi-tenant database. Data and services generated by the virtual applications 828 are provided via a network 845 to any number of client devices 840, as desired. Each virtual application 828 is suitably generated at run-time (or on-demand) using a common application platform 810 that securely provides access to the data 832 in the database 830 for each of the various tenants subscribing to the multi-tenant system 800. In accordance with one non-limiting example, the multi-tenant system 800 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 830. In this regard, each tenant includes one or more users associated with, assigned to, or otherwise belonging to that respective tenant. To put it another way, each respective user within the multi-tenant system 800 is associated with, assigned to, or otherwise belongs to a particular tenant of the plurality of tenants supported by the multi-tenant system 800. Tenants may represent customers, customer departments, business or legal organizations, and/or any other entities that maintain data for particular sets of users within the multi-tenant system 800 (i.e., in the multi-tenant database 830). For example, the application server 802 may be associated with one or more tenants supported by the multi-tenant system 800. Although multiple tenants may share access to the server 802 and the database 830, the particular data and services provided from the server 802 to each tenant can be securely isolated from those provided to other tenants (e.g., by restricting other tenants from accessing a particular tenant's data using that tenant's unique organization identifier as a filtering criterion). The multi-tenant architecture therefore allows different sets of users to share functionality and hardware resources without necessarily sharing any of the data 832 belonging to or otherwise associated with other tenants.

The multi-tenant database 830 is any sort of repository or other data storage system capable of storing and managing the data 832 associated with any number of tenants. The database 830 may be implemented using any type of conventional database server hardware. In various embodiments, the database 830 shares processing hardware 804 with the server 802. In other embodiments, the database 830 is implemented using separate physical and/or virtual database server hardware that communicates with the server 802 to perform the various functions described herein. In an exemplary embodiment, the database 830 includes a database management system or other equivalent software capable of determining an optimal query plan for retrieving and providing a particular subset of the data 832 to an instance of virtual application 828 in response to a query initiated or otherwise provided by a virtual application 828. The multi-tenant database 830 may alternatively be referred to herein as an on-demand database, in that the multi-tenant database 830 provides (or is available to provide) data at run-time to on-demand virtual applications 828 generated by the application platform 810.

In practice, the data 832 may be organized and formatted in any manner to support the application platform 810. In various embodiments, the data 832 is suitably organized into a relatively small number of large data tables to maintain a semi-amorphous "heap"-type format. The data 832 can then be organized as needed for a particular virtual application 828. In various embodiments, conventional data relationships are established using any number of pivot tables 834 that establish indexing, uniqueness, relationships between entities, and/or other aspects of conventional database organization as desired. Further data manipulation and report formatting is generally performed at run-time using a variety of metadata constructs. Metadata within a universal data directory (UDD) 836, for example, can be used to describe any number of forms, reports, workflows, user access privileges, business logic and other constructs that are common to multiple tenants. Tenant-specific formatting, functions and other constructs may be maintained as tenant-specific metadata 838 for each tenant, as desired. Rather than forcing the data 832 into an inflexible global structure that is common to all tenants and applications, the database 830 is organized to be relatively amorphous, with the pivot tables 834 and the metadata 838 providing additional structure on an as-needed basis. To that end, the application platform 810 suitably uses the pivot tables 834 and/or the metadata 838 to generate "virtual" components of the virtual applications 828 to logically obtain, process, and present the relatively amorphous data 832 from the database 830.

The server 802 is implemented using one or more actual and/or virtual computing systems that collectively provide the dynamic application platform 810 for generating the virtual applications 828. For example, the server 802 may be implemented using a cluster of actual and/or virtual servers operating in conjunction with each other, typically in association with conventional network communications, cluster management, load balancing and other features as appropriate. The server 802 operates with any sort of conventional processing hardware 804, such as a processor 805, memory 806, input/output features 808 and the like. The input/output features 808 generally represent the interface(s) to networks (e.g., to the network 845, or any other local area, wide area or other network), mass storage, display devices, data entry devices and/or the like. The processor 805 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 806 represents any non-transitory short or long term storage or other computer-readable media capable of storing programming instructions for execution on the processor 805, including any sort of random access memory (RAM), read only memory (ROM), flash memory, magnetic or optical mass storage, and/or the like. The computer-executable programming instructions, when read and executed by the server 802 and/or processor 805, cause the server 802 and/or processor 805 to create, generate, or otherwise facilitate the application platform 810 and/or virtual applications 828 and perform one or more additional tasks, operations, functions, and/or processes described herein. It should be noted that the memory 806 represents one suitable implementation of such computer-readable media, and alternatively or additionally, the server 802 could receive and cooperate with external computer-readable media that is realized as a portable or mobile component or application platform, e.g., a portable hard drive, a USB flash drive, an optical disc, or the like.

The application platform 810 is any sort of software application or other data processing engine that generates the virtual applications 828 that provide data and/or services to the client devices 840. In a typical embodiment, the application platform 810 gains access to processing resources, communications interfaces and other features of the processing hardware 804 using any sort of conventional or proprietary operating system 809. The virtual applications 828 are typically generated at run-time in response to input received from the client devices 840. For the illustrated embodiment, the application platform 810 includes a bulk data processing engine 812, a query generator 814, a search engine 816 that provides text indexing and other search functionality, and a runtime application generator 820. Each of these features may be implemented as a separate process or other module, and many equivalent embodiments could include different and/or additional features, components or other modules as desired.

The runtime application generator 820 dynamically builds and executes the virtual applications 828 in response to specific requests received from the client devices 840. The virtual applications 828 are typically constructed in accordance with the tenant-specific metadata 838, which describes the particular tables, reports, interfaces and/or other features of the particular application 828. In various embodiments, each virtual application 828 generates dynamic web content that can be served to a browser or other client program 842 associated with its client device 840, as appropriate.

The runtime application generator 820 suitably interacts with the query generator 814 to efficiently obtain multi-tenant data 832 from the database 830 as needed in response to input queries initiated or otherwise provided by users of the client devices 840. In a typical embodiment, the query generator 814 considers the identity of the user requesting a particular function (along with the user's associated tenant), and then builds and executes queries to the database 830 using system-wide metadata 836, tenant specific metadata 838, pivot tables 834, and/or any other available resources. The query generator 814 in this example therefore maintains security of the common database 830 by ensuring that queries are consistent with access privileges granted to the user and/or tenant that initiated the request. In this manner, the query generator 814 suitably obtains requested subsets of data 832 accessible to a user and/or tenant from the database 830 as needed to populate the tables, reports or other features of the particular virtual application 828 for that user and/or tenant. Contemplated herein are embodiments of formatting a user input query from the query generator 814 into a second query language, for transmission to a query response interface. The multi-tenant system 800 includes a mechanism for fetching data from external systems, and the present disclosure provides a system allowing for the transforming of the "shape" of query parameters from an n-ary tree into a binary tree.

Still referring to FIG. 8, the data processing engine 812 performs bulk processing operations on the data 832 such as uploads or downloads, updates, online transaction processing, and/or the like. In many embodiments, less urgent bulk processing of the data 832 can be scheduled to occur as processing resources become available, thereby giving priority to more urgent data processing by the query generator 814, the search engine 816, the virtual applications 828, etc.

In exemplary embodiments, the application platform 810 is utilized to create and/or generate data-driven virtual applications 828 for the tenants that they support. Such virtual applications 828 may make use of interface features such as custom (or tenant-specific) screens 824, standard (or universal) screens 822 or the like. Any number of custom and/or standard objects 826 may also be available for integration into tenant-developed virtual applications 828. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. For example, a virtual CRM application may utilize standard objects 826 such as "account" objects, "opportunity" objects, "contact" objects, or the like. The data 832 associated with each virtual application 828 is provided to the database 830, as appropriate, and stored until it is requested or is otherwise needed, along with the metadata 838 that describes the particular features (e.g., reports, tables, functions, objects, fields, formulas, code, etc.) of that particular virtual application 828. For example, a virtual application 828 may include a number of objects 826 accessible to a tenant, wherein for each object 826 accessible to the tenant, information pertaining to its object type along with values for various fields associated with that respective object type are maintained as metadata 838 in the database 830. In this regard, the object type defines the structure (e.g., the formatting, functions and other constructs) of each respective object 826 and the various fields associated therewith.

Still referring to FIG. 8, the data and services provided by the server 802 can be retrieved using any sort of personal computer, mobile telephone, tablet or other network-enabled client device 840 on the network 845. In an exemplary embodiment, the client device 840 includes a display device, such as a monitor, screen, or another conventional electronic display capable of graphically presenting data and/or information retrieved from the multi-tenant database 830. Typically, the user operates a conventional browser application or other client program 842 executed by the client device 840 to contact the server 802 via the network 845 using a networking protocol, such as the hypertext transport protocol (HTTP) or the like. The user typically authenticates his or her identity to the server 802 to obtain a session identifier ("SessionID") that identifies the user in subsequent communications with the server 802. When the identified user requests access to a virtual application 828, the runtime application generator 820 suitably creates the application at run time based upon the metadata 838, as appropriate. As noted above, the virtual application 828 may contain Java, ActiveX, or other content that can be presented using conventional client software running on the client device 840; other embodiments may simply provide dynamic web or other content that can be presented and viewed by the user, as desired.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic shown in FIG. 25 depicts one exemplary arrangement of elements, additional intervening elements, devices, features, or components may be present in an embodiment of the depicted subject matter.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for obtaining query response data by a relational database management system, the method comprising:
receiving a user input query, by a processor associated with the relational database management system, wherein the user input query comprises a query request for a set of data;
formatting the user input query into a second query language suitable for communication between the relational database management system and a query response interface associated with a second data storage external to the relational database management system, by the processor, to generate a reformatted user input query, wherein the relational database management system is configured to perform query operations using an n-ary tree format, and wherein the query response interface is configured to perform query operations using a binary tree format consisting of two child nodes per non-terminal node of a binary tree; and
transmitting the reformatted user input query to the query response interface, via a communication device communicatively coupled to the processor.

2. The method of claim 1, further comprising:
in response to transmitting the reformatted user input query, receiving a query response comprising the binary tree format;
translating the query response into the n-ary tree format, to generate a reformatted query response; and
presenting the reformatted query response, by a display device communicatively coupled to the processor associated with the relational database management system.

3. The method of claim 2, further comprising:
creating one or more standard objects suitable for interpretation and use by the relational database management system, based on the reformatted query response in the n-ary tree format; and
incorporating the one or more standard objects into the relational database management system.

4. The method of claim 1, wherein formatting the user input query into the query language further comprises translating the n-ary tree format of the user input query into the binary tree format, to create a resultant binary tree query, wherein the reformatted user input query comprises the resultant binary tree query; and
wherein transmitting the reformatted user input query further comprises passing the resultant binary tree query to the query response interface via a data provider.

5. The method of claim 1, wherein the processor is associated with a data provider communicatively coupled to the relational database management system, the data provider configured to:
translate data transmissions from the relational database management system and a second computer system comprising at least the second data storage; and
translate data transmissions from the second computer system to the relational database management system.

6. The method of claim 5, wherein the second computer system comprises at least one of a second relational database management system, a second API, or other data storage hardware using communication protocol compatible with the API.

7. The method of claim 1, further comprising:
presenting a graphical user interface (GUI), by the processor;
receiving the user input query, via the GUI; and
translating the user input query into an Object Query Language (OQL) query compatible with the relational database management system;
wherein formatting the user input query comprises formatting the OQL query into the reformatted user input query.

8. The method of claim 1, further comprising:
presenting a graphical user interface (GUI), by the processor;
receiving the user input query, via the GUI; and
translating the user input query into a Structured Query Language (SQL) query compatible with the relational database management system;
wherein formatting the user input query comprises formatting the SQL query into the reformatted user input query.

9. A system for obtaining query response data by a relational database management system, the system comprising:
a system memory element;
a user interface, configured to receive user input queries, each of the user input queries comprising a query request for data;
a communication device, configured to transmit formatted requests from the relational database management system to a query response interface; and
at least one processor associated with the relational database management system, the at least one processor communicatively coupled to the system memory element and the user interface, the at least one processor configured to:
receive a user input query, via the user interface;
format the user input query into a second query language suitable for communication between the relational database management system and a query response interface associated with a second data storage external to the relational database management system, to generate a reformatted user input query, wherein the relational database management system is configured to perform query operations using an n-ary tree format, and wherein the query response interface is configured to perform query operations using a binary tree format consisting of two child nodes per non-terminal node of a binary tree; and
transmit the reformatted user input query to the query response interface, via the communication device.

10. The system of claim 9, wherein the system further comprises a display device communicatively coupled to the at least one processor; and
wherein, in response to transmitting the reformatted user input query, the at least one processor is further configured to:
receive a query response comprising the binary tree format, via the communication device;
translate the query response into the n-ary tree format, to generate a reformatted query response; and
present the reformatted query response, via the display device.

11. The system of claim 10, wherein the at least one processor is further configured to:
create one or more standard objects suitable for interpretation and use by the relational database management system, based on the reformatted query response in the n-ary tree format; and
incorporate the one or more standard objects into the relational database management system.

12. The system of claim 9, wherein the at least one processor is further configured to format the user input query into the query language, by translating the n-ary tree format of the user input query into the binary tree format, to create a resultant binary tree query, wherein the reformatted user input query comprises the resultant binary tree query; and wherein the at least one processor is further configured to transmit the reformatted user input query by passing the resultant binary tree query to the query response interface via a data provider.

13. The system of claim 9, wherein the at least one processor is associated with a data provider communicatively coupled to the relational database management system, the data provider configured to:
translate data transmissions from the relational database management system and a second computer system comprising at least the second data storage; and
translate data transmissions from the second computer system to the relational database management system.

14. The system of claim 13, wherein the second computer system comprises at least one of a second relational database management system, a second API, or other data storage hardware using communication protocol compatible with the API.

15. The system of claim 9, wherein the at least one processor is further configured to:
present a graphical user interface (GUI), via the display device;
receive the user input query, via the GUI;
translate the user input query into an Object Query Language (OQL) query compatible with the relational database management system; and
format the user input query by formatting the OQL query into the reformatted user input query.

16. The system of claim 9, wherein the at least one processor is further configured to:
present a graphical user interface (GUI), via the display device;
receive the user input query, via the GUI;
translate the user input query into a Structured Query Language (SQL) query compatible with the relational database management system; and
format the user input query by formatting the SQL query into the reformatted user input query.

17. A non-transitory, computer-readable medium containing instructions thereon, which, when executed by a processor, are capable of performing a method for obtaining query response data by a relational database management system, the method comprising:
receiving a user input query, by a processor associated with the relational database management system, wherein the user input query comprises a query request for a set of data;
formatting the user input query into a second query language suitable for communication between the relational database management system and a query response interface associated with a second data storage external to the relational database management system, by the processor, to generate a reformatted user input query, wherein the relational database management system is configured to perform query operations using an n-ary tree format, and wherein the query response interface is configured to perform query operations using a binary tree format consisting of two child nodes per non-terminal node of a binary tree;
transmitting the reformatted user input query to the query response interface, via a communication device communicatively coupled to the processor;
in response to transmitting the reformatted user input query, receiving a query response comprising the binary tree format;
translating the query response into the n-ary tree format, to generate a reformatted query response; and presenting the reformatted query response, by a display device communicatively coupled to the processor associated with the relational database management system.

18. The non-transitory, computer-readable medium of claim 17, wherein the method further comprises:
   creating one or more standard objects suitable for interpretation and use by the relational database management system, based on the reformatted query response in the n-ary tree format; and
   incorporating the one or more standard objects into the relational database management system.

19. The non-transitory, computer-readable medium of claim 17, wherein the method further comprises:
   presenting a graphical user interface (GUI), by the processor;
   receiving the user input query, via the GUI;
   translating the user input query into an Object Query Language (OQL) query compatible with the relational database management system;
   wherein formatting the user input query comprises formatting the OQL query into the reformatted user input query.

20. The non-transitory, computer-readable medium of claim 17, wherein the method further comprises:
   presenting a graphical user interface (GUI), by the processor;
   receiving the user input query, via the GUI;
   translating the user input query into a Structured Query Language (SQL) query compatible with the relational database management system;
   wherein formatting the user input query comprises formatting the SQL query into the reformatted user input query.

* * * * *